United States Patent [19]

Kato et al.

[11] Patent Number: 4,731,312
[45] Date of Patent: Mar. 15, 1988

[54] PHOTOCONDUCTOR FOR ELECTROPHOTOGRAPHY COMPRISES INDIUM PHTHALOCYANINE

[75] Inventors: Masakazu Kato; Yoichi Nishioka; Katsuaki Kaife, all of Tokyo, Japan

[73] Assignee: Oki Electric Industry Co., Ltd., Tokyo, Japan

[21] Appl. No.: 15,599

[22] Filed: Feb. 17, 1987

Related U.S. Application Data

[60] Division of Ser. No. 786,717, Oct. 15, 1985, abandoned, which is a continuation of Ser. No. 591,526, Mar. 20, 1984, abandoned.

[30] Foreign Application Priority Data

Mar. 25, 1983 [JP] Japan .................................. 58-48963
Mar. 25, 1983 [JP] Japan .................................. 58-48964
Mar. 25, 1983 [JP] Japan .................................. 58-48965

[51] Int. Cl.$^4$ ............................................. G03G 5/06
[52] U.S. Cl. ............................................ 430/31; 430/58; 430/76; 430/77; 430/78; 430/128; 430/945
[58] Field of Search .......................... 430/58, 78, 128

[56] References Cited

U.S. PATENT DOCUMENTS 3,895,944  7/1985  Wiedemann et al. ............ 430/128 X
4,226,928 10/1980  Nakazawa et al. ..................... 430/57

OTHER PUBLICATIONS

Arishima et al, Applied Physics Letters 40(3) 1; Feb. 1982, pp. 279-281.

Primary Examiner—J. David Welsh
Attorney, Agent, or Firm—Wenderoth, Lind & Ponack

[57] ABSTRACT

A function separation type photoconductor for use in electrophotography comprises an electroconductive substrate, a carrier generation layer vapor deposited on the substrate and a carrier transport layer formed on the carrier generation layer. The carrier generation layer is made of an indium phthalocyanine having the general formula

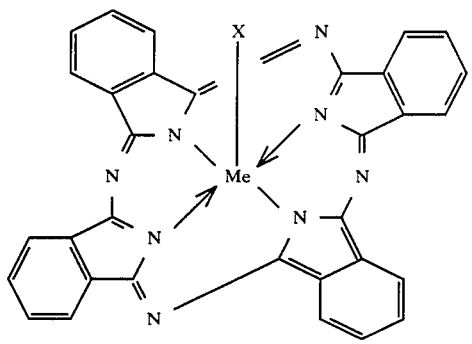

wherein Me represents indium, and X is a halogen selected from the group consisting of chlorine, bromine and iodine.

9 Claims, 11 Drawing Figures

FIG_1 PRIOR ART
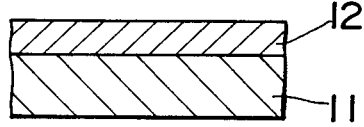
FIG_2
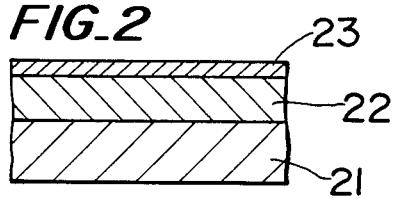
FIG_3
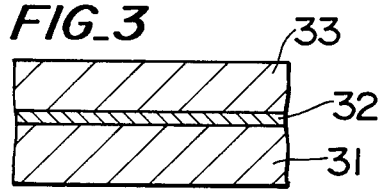
FIG_6
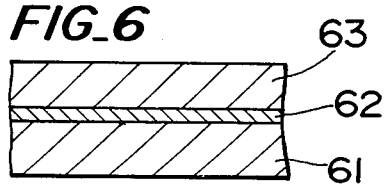

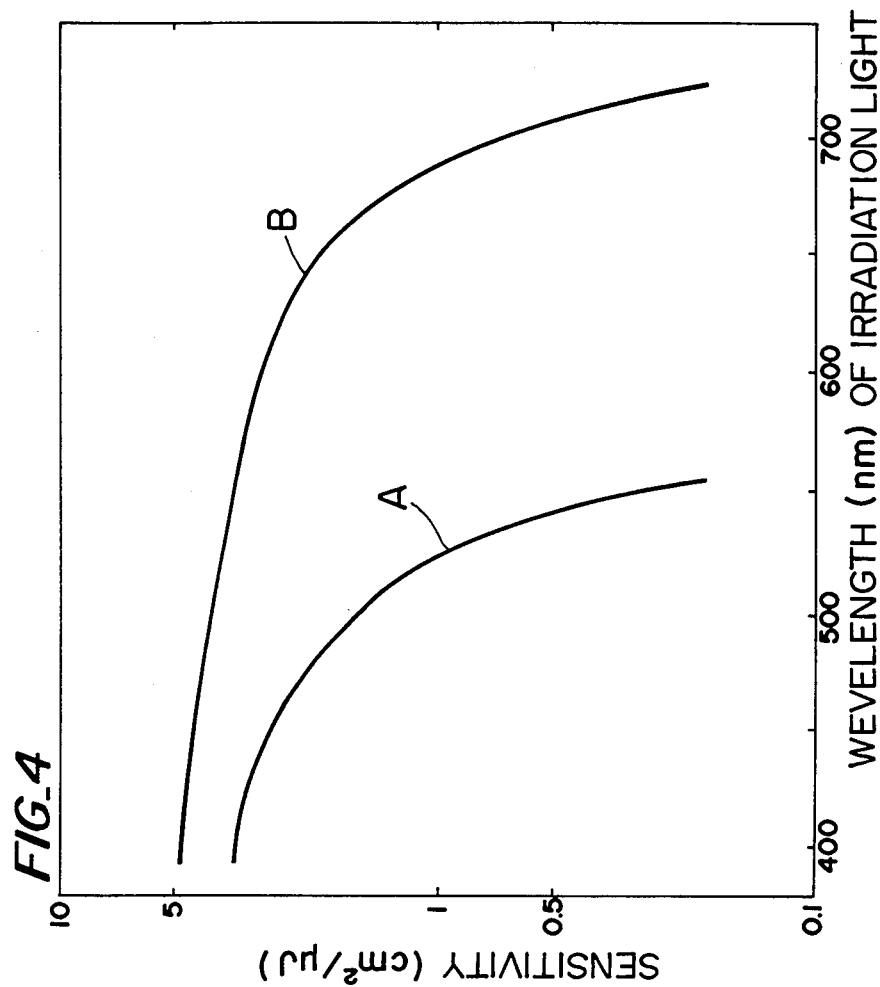

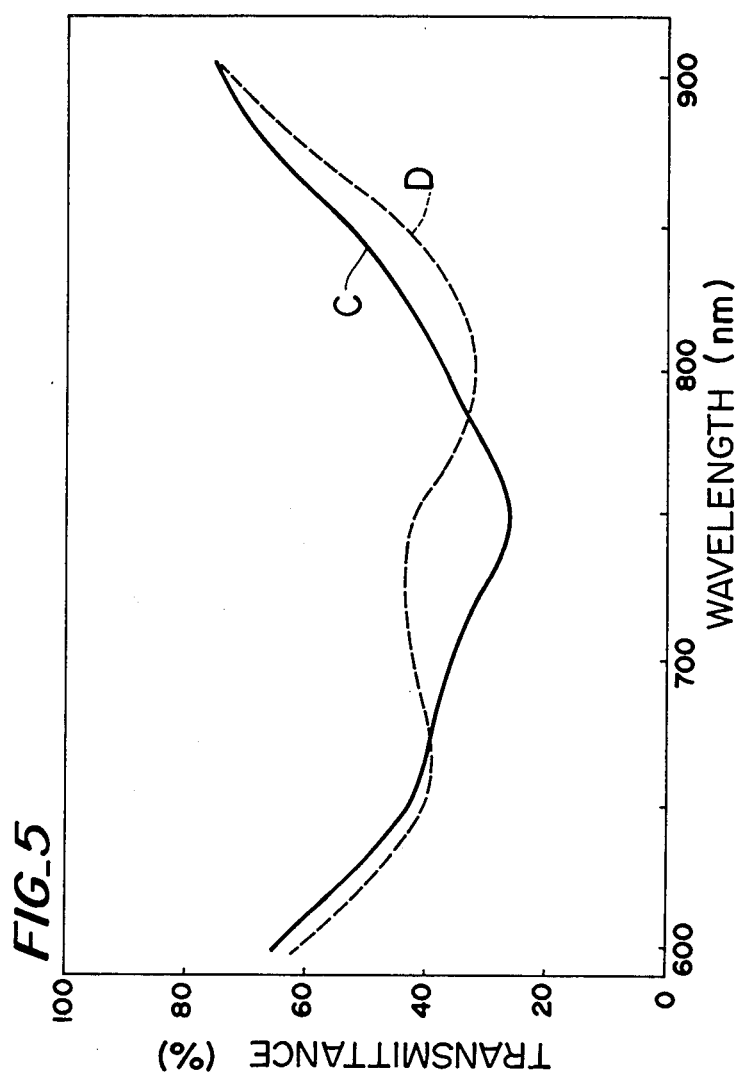
FIG_5

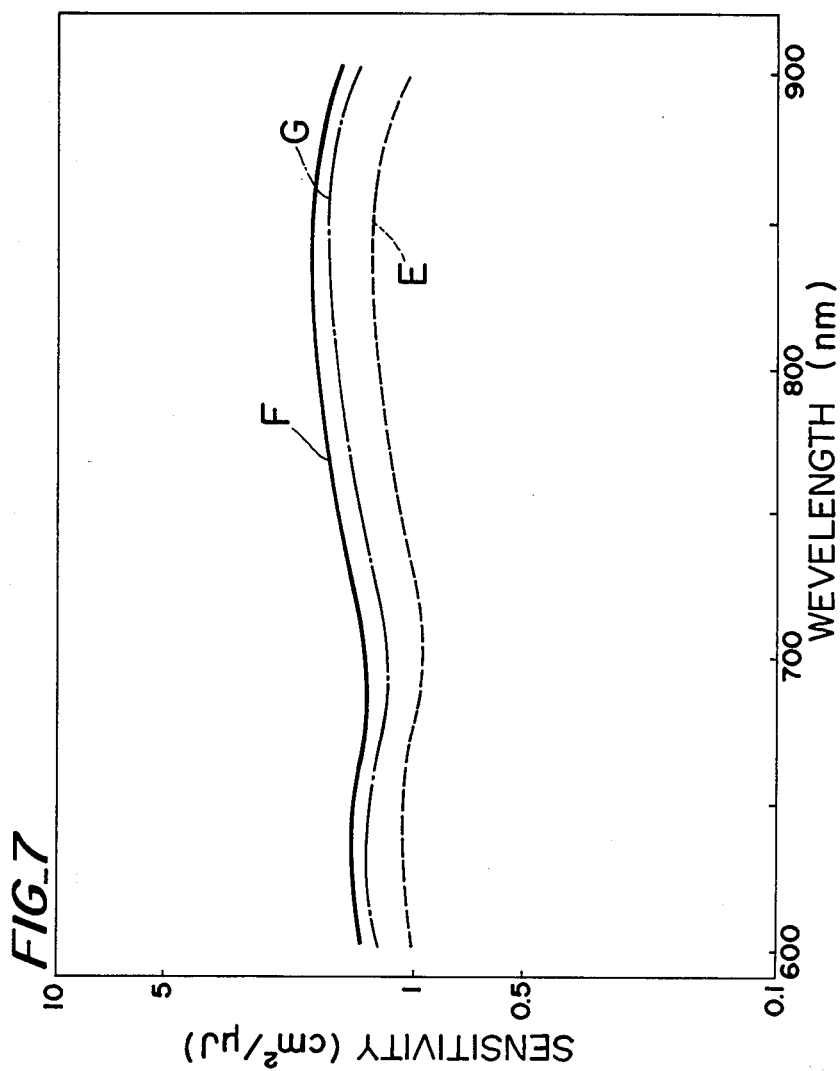

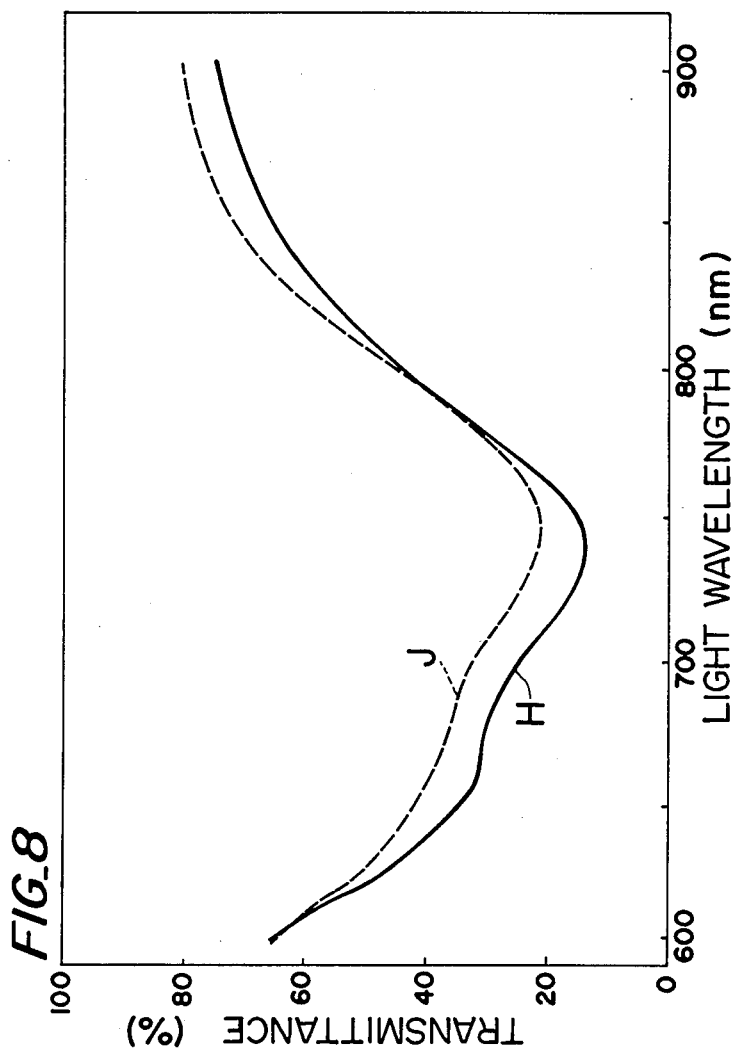

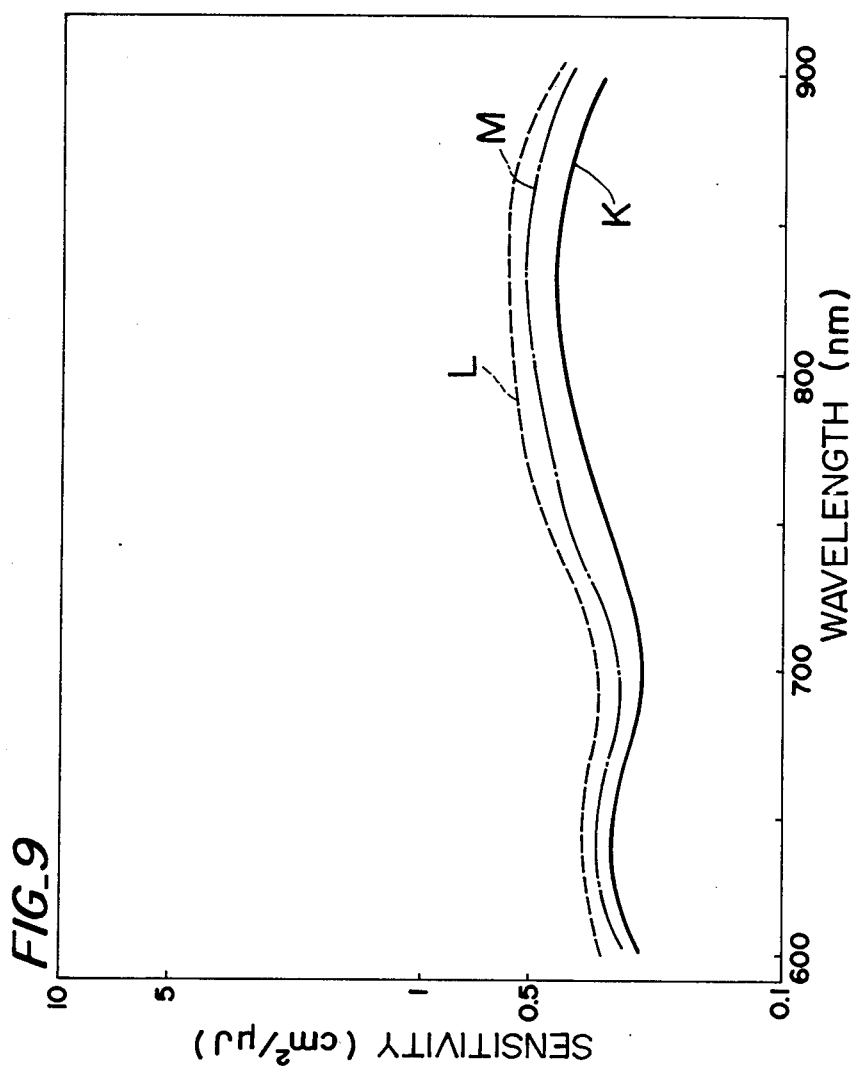

PHOTOCONDUCTOR FOR ELECTROPHOTOGRAPHY COMPRISES INDIUM PHTHALOCYANINE

This application is a division of now abandoned application Ser. No. 786,717, filed Oct. 15, 1985, which, in turn, is a continuation of Ser. No. 591,526, filed Mar. 20, 1984, now abandoned.

BACKGROUND OF THE INVENTION

1. Field of the Invention

This invention relates to photoconductors for electrophotography, and more particularly to photoconductors having excellent physical characteristics and manifesting high sensitivity to light a long wavelength of around 800 nm or more.

2. Description of the Prior Art

An example of a conventional photoconductor will be described by referring to FIG. 1 wherein the photoconductor is prepared by forming a selenium (Se) film 12 on an electroconductive substrate 11 made of, for example, aluminum or the like with the vacuum deposition method. However, the spectral sensitivity of the Se photoconductor decreases rapidly, when the wavelength of irradiation light exceeds 500 nm as indicated by curve A in FIG. 4. In this case, the value of the sensitivity is represented by a reciprocal of an amount of light exposure required for reducing the initial potential to one half (The same definition is also used hereinafter).

As another example of conventional photoconductors, there has been proposed a Se-Te alloy photoconductor which is prepared by adding tellurium (Te) to selenium (Se) so that the spectral sensitivity will shift toward the longer wavelengths. In such an Se-Te alloy photoconductor, however, the surface charge retention characteristics becomes inferior with increase in the amount of Te added so that such photoconductor cannot actually be utilized as a photosensitive material. In order to improve the above-mentioned charge retention characteristics, there has been also used a two-layer type photoconductor, which is prepared by forming an SE layer 22 having a thickness of about 50 μm on an electroconductive substrate 21 and then forming an Se-Te alloy layer 23 having a thickness of 2-3 m on the Se layer 22 as shown in FIG. 2. In such a two-layer type photoconductor, however, when the surface Se-Te alloy layer 23 consists of Se$_{85}$ and Te$_{15}$ the spectral sensitivity thereof decreases rapidly at a wavelength of 650 nm or more and at a wavelength of more than 700 μm the sensitivity decreases further to such extent that the photoconductor of this type cannot practically be utilized as indicated by curve B in FIG. 4.

As a still further example of conventional photoconductors, there has been proposed a two-layer function separating type photoconductor shown in FIG. 3 which is prepared by forming a carrier generation layer 32 on an aluminum substrate 31 which comprise a chlorodianeblue or squarylium acid derivative coating, and then overcoating polyvinylcarbazole or a mixture of pyrazoline and polycarbonate resin to form a carrier transport layer 33. This type of photoconductor has a sufficiently high sensitivity to visible light, but it can scarcely be employed for irradiation light having a wavelength of 650 nm or more as the photosensitive material as in the foregoing conventional photoconductors.

Recently, various attempts have been made to utilize a semiconductor laser as a light source in a laser beam printer or the like wherein laser light is utilized as the light source and a photoconductor for use in electrophotography is employed for the purpose of improving the functions thereof. Such semiconductor laser light source generally has a wavelength of 800–850 nm.

A mentioned above, at present, photoconductors having high sensitivity to light of 800 nm or longer wavelength are scarcely used so that development of a photoconductor having high sensitivity to light having a wavelength of 800 nm or longer is strongly desired.

SUMMARY OF THE INVENTION

It is an object of this invention to provide an improved function separating type photoconductor for use in electrophotography and having high sensitivities at wavelengths of 800 nm or more.

According to this invention, there is provided a photoconductor for use in electrophotography comprising an electroconductive substrate, a carrier generation layer vapor deposited on the substrate, and a carrier transport layer formed on the carrier generation layer, the carrier generation layer being made of an indium phthalocyanine having a general formula

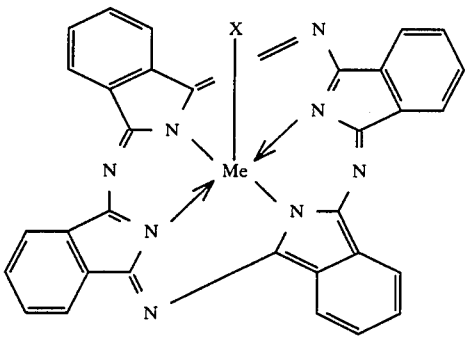

wherein Me represents indium In, X a halogen, selected from the group consisting of chlorine, bromine and iodine.

BRIEF DESCRIPTION OF THE DRAWINGS

In the accompanying drawings:

FIG. 1 is a sectional view showing a conventional Se photoconductor;

FIG. 2 is a sectional view showing a conventional Se and Se-Te alloy two layer type photoconductor;

FIG. 3 is a sectional view showing a conventional two layer function separating type photoconductor for use in electrophotography;

FIG. 4 is a graph showing spectral sensitivity curves of the photoconductors shown in FIGS. 1 and 2;

FIG. 5 is a graph showing light absorption spectra of the phthalocyanine pigment used in the present invention;

FIG. 6 is a sectional view showing a photoconductor according to the present invention;

FIG. 7 is a graph showing spectral sensitivity curves of the photoconductors according to the present invention;

FIGS. 8 and 10 are graphs showing light absorption spectra of the phthalocyanine pigments obtained in the other examples according to the present invention; and FIGS. 9 and 11 are graphs showing spectral sensitivity curves of the phthalocyanine pigments obtained in the other examples according to the present invention.

DESCRIPTION OF THE PREFERRED EMBODIMENTS

Figure 10:
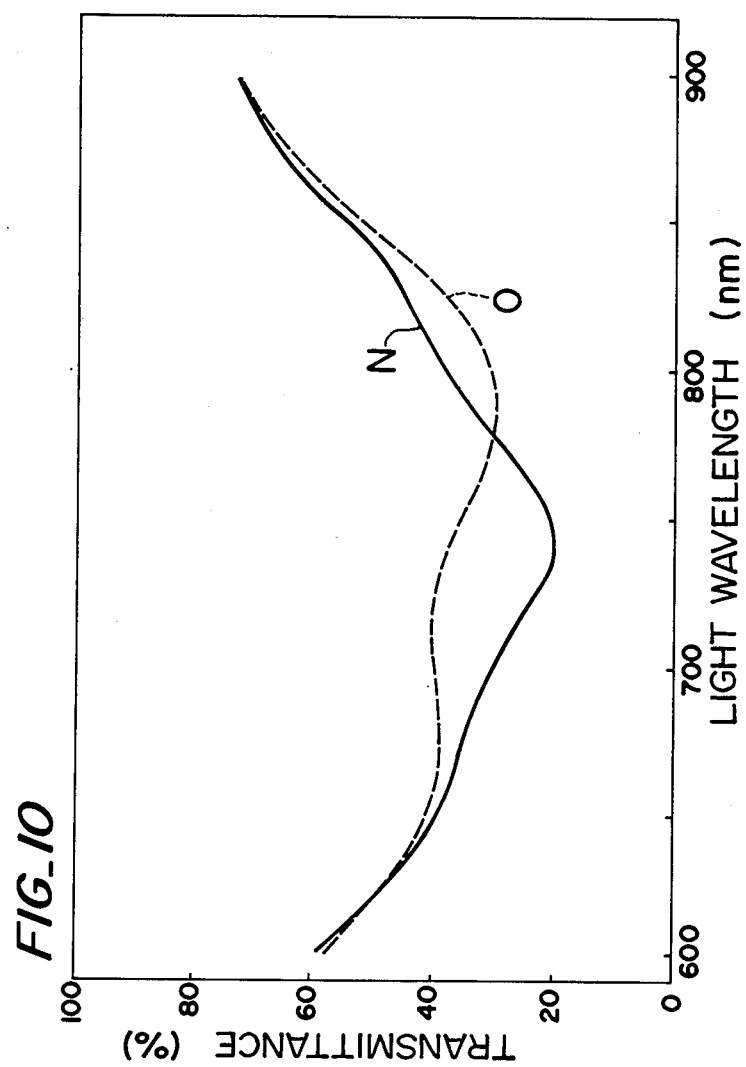

Preferred examples of this invention will now be in detail described as follows.

Example 1

12.8 g of o-phthalodinitrile and 5.6 g of indium chloride ($InCl_3$) having a 99.999% purity were added to 100 ml of quinoline contained in a flask and the mixture were caused to react while refluxing them for about 40 minutes. It was confirmed that the structure of the resulting product corresponds to phthalocyanine having the above described general formula. Furthermore, as a result of element analysis of the product, it was confirmed that the ratio of the elements was $C_{32}H_{16.5}N_{7.9}Cl_{1.1}In_{0.9}$ so that the product was identified as phthalocyanine (hereinafter referred to simply as "InClPc") having the aforementioned general formula wherein one Cl is combined with Me positioned at the central portion of the formula (hereinafter referred to simply as "central metal") and having substantially an element ratio of $C_{32}H_{16}N_8Cl_1In_1$.

Then, 0.01 g of the InClPc was placed in an alumina crucible disposed in a vacuum evaporation coater and the temperature of the crucible was maintained at 400° C. during the vacuum vapor deposition to form a thin film (having a thickness of 0.02 μm on a glass substrate. The light absorption spectrum of the resulting thin film with respect to light having wavelengths of 600–900 nm was measured with an automatic recording spectrophotometer and the results of measurement depicted in FIG. 5 wherein curve C shows the spectrum of the aforementioned thin film and the maximum point thereof was observed at 745 nm. The thin film was then exposed to tetrahydrofuran (THF) vapor for 20 hours. It was found that the absorption peak of the spectrum of the film thus exposed has shifted to 850 nm on the side of longer wavelength as shown by curve D in FIG. 5.

Then, InClPc film was vapor deposited on an aluminum substrate 61 to a thickness of 0.2 μm to form a carrier generation layer 62 as shown in FIG. 6. The thin film thus formed was then exposed to THF vapor for 20 hours, and then coated with polyvinylcarbazole resin for electrophotography dissolved in THF. When the coated film was sufficiently dried to remove THF, a carrier transport layer 63 (8 μm thickness) was formed to complete a photoconductor.

The spectral sensitivity representing electrophotographic characteristic of the resulting photoconductor is shown by curve E in FIG. 7.

As is apparent from FIG. 7, with this photoconductor a high sensitivity of 1.0 $cm^2/\mu J$ can be obtained even at a wavelength of 900 nm. A sufficiently high sensitivity of 1.3 $cm^2/\mu J$ can also be obtained at wavelengths of 800–850 nm which correspond to the wavelengths of ordinary semiconductor laser light.

Example 2

A thin film of InClPc was vapor deposited on an aluminum substrate to a thickness of 0.2 μm in the manner as in Example 1. The resulting thin film was coated with a THF solution of polyvinylcarbazole without subjecting it to the THF solvent vapor treatment in Example 1 to form a carrier transport layer having a dry thickness of 8 μm to complete a photoconductor.

Spectral sensitivity of the photoconductor of Example 2 is shown by curve F in FIG. 7. As can be noted from curve F the photoconductor of example 2 has a high sensitivity of 2 $cm^2/\mu J$ at wavelengths of 800–850 nm and a sensitivity of 1.6 $cm^2/\mu J$ at a wavelength of 900 nm. More specifically, the photoconductor of Example 2 has very high sensitivity, even though the solvent vapor treatment of the carrier generation layer was omitted so that the photoconductor is more suitable for use in the laser beam printer which utilizes a semiconductor laser emitting light having wavelengths of 800–850 nm as the light source. In addition, since the photoconductor of this example is prepared without solvent vapor treatment, there is an advantage that the manufacturing steps can be simplified.

Example 3

In the same manner as in Examples 1 and 2, InClPc was vapor deposited on an aluminum substrate to a thickness of 0.2 μm to form a carrier generation layer. Then, without subjecting the carrier generation layer to the THF solvent vapor treatment, a film having a dry thickness of 6 μm was formed on the carrier generation layer by coating the same with solution prepared by dissolving in THF a 1:1 mixture, in weight ratio, of 1-phenyl-3-(4′diethylaminostyryl)-5-(4″-diethylaminophenyl)-2-pyrazoline, one of the pyrazoline derivatives, and phenoxy resin (manufactured by Union Carbide Corp.). In this case, the pyrazoline derivative was prepared by forming 1,5-diphenyl-1,4-pentadiene-3-one from benzaldehyde and acetone, and then reacting the 1,5-diphenyl-1,4-pentadiene-3-one with phenylhydrazine.

Spectral sensitivity of the resulting photoconductor is shown by curve G in FIG. 7. As can be noted from curve G this photoconductor has substantially the same high sensitivity of 1.7 $cm^2/\mu J$ at wavelengths of 800–850 nm and 1.5 $cm^2/\mu J$ at a wavelength of 900 nm as those of Examples 1 and 2. According to Example 3, even though the carrier transport layer of Example 2 is made of a pyrazoline derivative, a photoconductor of high sensitivity can be obtained so that this photoconductor is also suitable for use in a laser beam printer wherein a light source having such light wavelengths of 800–850 nm is employed.

Example 4

12.8 g of o-phthalodinitrile was caused to react with 12.5 g of indium iodide ($InI_3$) having 99.999% purity of 100 ml of quinoline contained in a flask while refluxing them for about 60 minutes in the same manner as in Example 1.

The resulting product was identified as phthalocyanine having the aforementioned general formula. More specifically, as a result of element analysis of the product, it was determined that the ratio of the elements was $C_{32}H_{15.9}N_{7.7}I_{1.0}In_{1.0}$, so that the resulting product was identified as phthalocyanine (hereinafter referred to simply as "InIPc") having the general formula as described above wherein one I is combined with the central metal and having an element ratio of substantially $C_{32}H_{16}N_8I_1In_1$.

Then, 0.01 g of this InIPc was placed in an alumina crucible contained in a vacuum evaporation coater metallizer and the temperature of the crucible was maintained at 500° C. during vacuum vapor deposition to form a thin film (having a thickness of 0.02 μm) on a glass substrate. The light absorption spectrum of the resulting thin film to light having wavelengths of 600–900 nm was measured with an automatic recording spectrophotometer in the same manner as above described and the results thereof are shown in FIG. 8 wherein curve H shows the spectrum of the aforementioned thin film itself and the maximum peak thereof appears at 740 nm. The thin film was then exposed to THF vapor for 20 hours. The spectrum of the thin film thus exposed shifted to the side of longer wavelength by 10 nm as shown by curve J in FIG. 8.

Next, an InIPc thin film having a 0.2 μm thickness was formed on an aluminum substrate 61 by the vacuum vapor deposition method to form the carrier generation layer as shown in FIG. 6. After exposing the film thus formed to THF vapor for 20 hours, the film was coated with polyvinylcarbazole resin for use in electrophotography and dissolved in THF. After the coated film was sufficiently dried to remove THF, a carrier transport layer 63 (8 μm thickness) was formed, thereby obtaining a photoconductor in the same manner as in Example 1.

The spectral sensitivity representing the electrophotographic characteristic of the resulting photoconductor is shown by curve K in FIG. 9.

As is apparent from FIG. 9, the photoconductor of this example has a high sensitivity of 0.3 cm$^2$/μJ even at a wavelength of 900 nm and it has a sufficiently high sensitivity of 0.45 cm$^2$/μJ at wavelengths of 800–850 nm which correspond to the wavelengths of an a ordinary semiconductor laser light.

Example 5

A thin film of InIPc having a thickness of 0.2 μm was formed on an aluminum substrate by the vacuum vapor deposition method in the manner as in Example 4. The resulting thin film was coated with a THF solution of polyvinylcarbazole without using the THF solvent vapor treatment described in Example 4 to form a carrier transport layer having a dry thickness of 8 μm, whereby a photoconductor was obtained.

The spectral sensitivity of this photoconductor is shown by curve L in FIG. 9 which clearly shows that the photoconductor of this example has a high sensitivity of 0.6 cm$^2$/μJ at wavelengths of 800–850 nm as well as 0.45 cm$^2$/μJ at a wavelength of 900 nm. More specifically, as mentioned above, the photoconductor according to Example 5 also shows very high sensitivity, even though the carrier generation layer was not subject to the solvent vapor treatment so that the photoconductor is more suitable for use in the laser beam printer wherein a semiconductor laser emitting light having wavelengths of 800–850 nm is utilized as the light source. In addition, since the photoconductor of this example is not subjected to the solvent vapor treatment, there is an advantage that the manufacturing steps can be simplified.

Example 6

In the same manner as in Examples 4 and 5, InIPc was utilized to form a carrier generation layer having a thickness of 0.2 μm on an aluminum substrate by the vacuum vapor deposition method. Then, without applying THF solvent vapor treatment as in the case of Example 5, the film (having a dry thickness of 6 μm) was formed on the carrier generation layer by coating the same with a solution prepared by dissolving in THF a 1:1 mixture, in weight ratio, of the aforementioned 1-phenyl-3-(4′-diethylaminostyryl-5-(4″-diethylaminophenyl)-2-pyrazoline and phenoxy resin.

Spectral sensitivity of the resulting photoconductor is shown by curve M in FIG. 9 which shows that the resulting photoconductor has substantially the same high sensitivity of 0.5 cm$^2$/μJ at wavelengths of 800–850 nm and 0.4 cm$^2$/μJ at a wavelength of 900 nm as those of Examples 4 and 5. In Example 6, although the carrier transport layer is made of a pyrazoline derivative like Example 5, a photoconductor of high sensitivity can be obtained so that it is suitable for use in a laser beam printer wherein a light source having such light wavelengths of 800–850 nm is also employed.

Example 7

A reaction between 12.8 g of o-phthalodinitrile and 8.9 g of indium bromide (InBr$_3$) having a purity of 99.999% was effected by adding them into 100 ml of quinoline contained in a flask while refluxing them in the same manner as in Example 1.

It was confirmed that the structure of the resulting product was phthalocyanine having the general formula described above. More specifically, as a result of element analysis of the product, it was confirmed that the ratio of elements is $C_{32}H_{15.4}N_{7.8}Br_{0.9}In_{1.2}$ so that the resulting product was identified as phthalocyanine (hereinafter referred to simply as "InBrPc") having the general formula as described above wherein one Br is combined with the central metal and having substantially an element ratio of $C_{32}H_{16}N_8Br_1In_1$.

Then, 0.01 g of the InBrPc was placed in an alumina crucible maintained at a temperature of 500° C. and then InBrPc was vapor deposited on a glass substrate to form a thin film having a thickness of 0.2 μm. The light absorption spectrum of this film with respect to light having wavelengths of 600–900 nm was measured by means of an automatic recording spectrophotometer in the same manner as above described and the results are shown in FIG. 10 wherein curve N shows the spectrum of the thin film itself whose maximum point appears at 740 nm. The thin film was then exposed to THF vapor for 20 hours, and the spectrum of the thin film thus exposed changed into one having an absorption peak at a wavelength of 785 nm as shown by curve O in FIG. 10.

Then, a thin film of this InIPc having a thickness of 0.2 μm was formed on an aluminum substrate 61 to form a carrier generation layer 62 as shown in FIG. 6. Then the assembly was exposed to THF vapor for 20 hours, and then coated with polyvinylcarbazole resin dissolved in THF. When the coated film was sufficiently dried to remove THF, a carrier transport layer 63 (8 μm thickness) was formed, whereby a photoconductor was obtained in the same manner as in Example 1.

Figure 11:
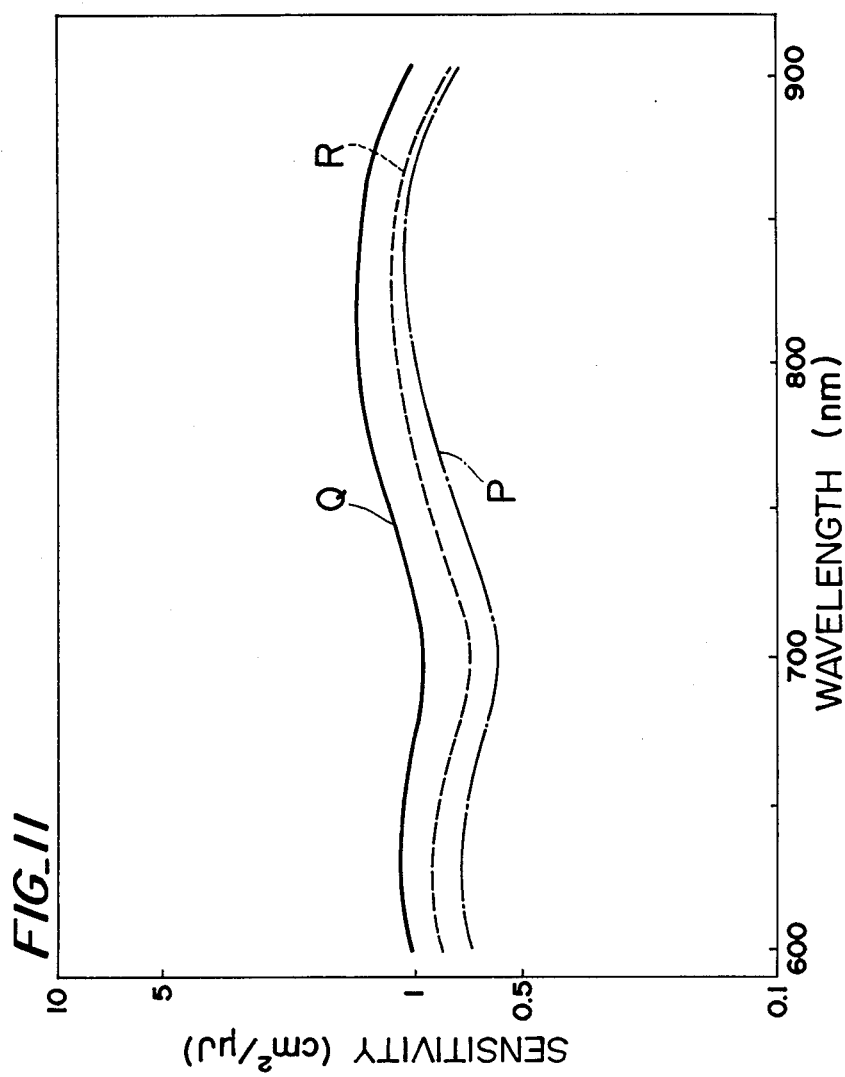

The spectral sensitivity representing the electrophotographic characteristic of the resulting photoconductor is shown by curve P in FIG. 11.

As is apparent from FIG. 11, the photoconductor of this example has a high sensitivity of 1.0 cm$^2$/μJ even at a wavelength of 900 nm and moreover has a sufficiently high sensitivity of 1.5 cm$^2$/μJ at wavelengths of 800–850 nm, which correspond to wavelengths of ordinary semiconductor laser light.

Example 8

In the same manner as in Example 7 the same InBrPc was vapor deposited on an aluminum substrate to form a film having a thickness of 0.2 μm. The resulting film was coated with a THF solution of polyvinylcarbazole without using the THF solvent vapor treatment in Example 7 to form a carrier transport layer having a dry thickness of 8 m to obtain a photoconductor.

The spectral sensitivity of the photoconductor of Example 8 is showing by curve Q in FIG. 11 which shows that the photoconductor of this example has a high sensitivity of 1.2 cm$^2$/μJ at wavelengths of 800–850 nm as well as 0.8 cm$^2$/μJ at a wavelength of 900 nm. Thus, the photoconductor of Example 8 also shows a very high sensitivity, although the carrier generation layer was not subjected to the solvent vapor treatment so that the photoconductor is more suitable for use in the laser beam printer wherein a semiconductor laser emitting light at wavelengths of 800–850 nm is utilized as its light source. In addition, since the photoconductor of this example was prepared without solvent vapor treatment, there is an advantage that the manufacturing step can be simplified.

Example 9

In the same manner as in Example 6, InBrPc was vapor deposited on an aluminum substrate to form a carrier generation layer having a thickness of 0.2 μm and then like Example 8, without using the THF solvent vapor treatment, a film having a dry thickness of 6 μm was formed on the carrier generation layer by coating the same with a solution prepared by dissolving in THF a 1:1 mixture, in weight ratio, of the aforementioned 1-phenyl-3-(4'-diethylaminostyryl)-5-(4''-diethylaminophenyl)-2-pyrazoline and phenoxy resin.

The spectral sensitivity of the resulting photoconductor is shown by curve R in FIG. 11 which shows that the photoconductor of this example has substantially the same high sensitivity of 1.1 cm$^2$/μJ at wavelengths of 800–850 nm and 0.8 cm$^2$/μJ at a wavelength of 900 nm as those of Examples 7 and 8. According to Example 9, although the carrier transport layer is also made of a pyrazoline derivative, a photoconductor of high sensitivity can be obtained so that the present photoconductor is also suitable for use in a laser beam printer wherein a light source emitting light having a wavelength of 800–850 nm is employed.

In the photoconductor according to the present invention, a very thin film of, for example, about 0.2 μm is sufficient to form the carrier generation layer so that only a short period of time is required for vapor deposition to manufacture photoconductors. Accordingly, the photoconductors can be mass produced at a low cost. Furthermore, since materials to be used for preparing the photoconductors are organic substances, there is no serious problem when discarding them. Besides there is an advantage that the photoconductor of the present invention is not only applicable for laser beam printers and facsimiles, but also can be used as optical sensors and other recording devices such as printers wherein a LED, particularly a semiconductor laser, is utilized as the light source.

What is claimed is:

1. In a method for electrophotography with a light source having a wavelength of about 650 nm or greater, which comprises exposing a photoconductor comprising an electroconductive substrate, a carrier generation layer vapor deposited on said substrate, and a carrier transport layer formed on the carrier generation layer, to a light image from said light source, the improvement wherein said carrier generation layer is made of an indium phthalocyanine having the formula

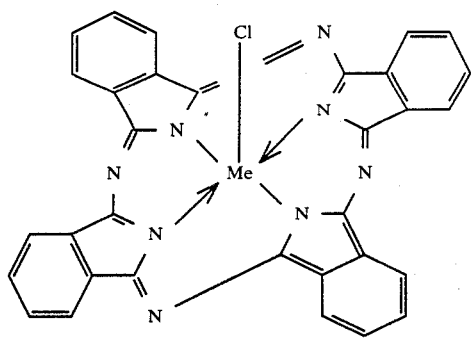

wherein Me represents indium, and said carrier generation layer having a transmittance with respect to applied wavelength as shown in FIG. 5.

2. The method according to claim 1 wherein said photoconductor exhibits a sensitivity with respect to applied wavelength as shown in FIG. 7.

3. The method according to claim 1 wherein the light source has a wavelength of about 800 nm or greater.

4. In a method for electrophotography with a light source having a wavelength of about 650 nm or greater, which comprises exposing a photoconductor comprising an electroconductive substrate, a carrier generation layer vapor deposited on said substrate, and a carrier transport layer formed on the carrier generation layer, to a light image from said light source, the improvement wherein said carrier generation layer is made of an indium phthalocyanine having the formula

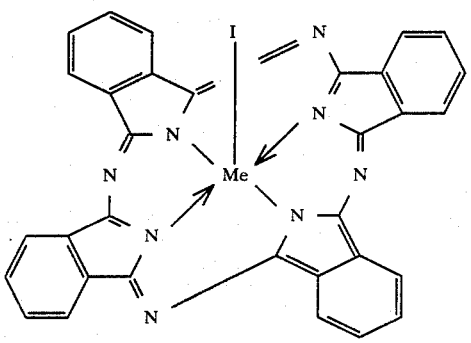

wherein Me represents indium, and said carrier generation layer having a transmittance with respect to applied wavelength as shown in FIG. 8.

5. The method according to claim 4 wherein said photoconductor exhibits a sensitivity with respect to applied wavelength as shown in FIG. 9.

6. The method according to claim 4 wherein said light source has a wavelength of about 800 nm or greater.

7. In a method for electrophotography with a light source having a wavelength of about 650 nm or greater, which comprises exposing a photoconductor comprising an electroconductive substrate, a carrier generation layer vapor deposited on said substrate, and a carrier transport layer formed on the carrier generation layer, to a light image from said light source, the improvement wherein said carrier generation layer is made of an indium phthalocyanine having the formula

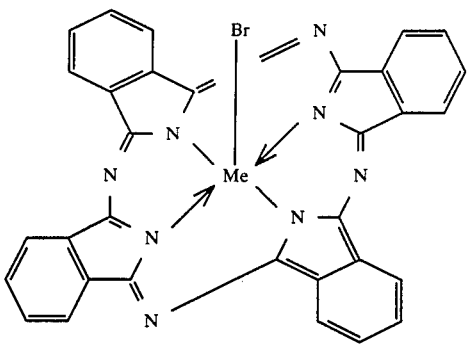

wherein Me represents indium, and said carrier generation layer having a transmittance with respect to applied wavelength as shown in FIG. 10.

8. The method according to claim 7 wherein the photoconductor exhibits a sensitivity with respect to applied wavelength as shown in FIG. 11.

9. The method according to claim 7 wherein said light source has a wavelength of about 800 nm or greater.

* * * * *